(12) United States Patent
Orozco

(10) Patent No.: US 12,203,215 B2
(45) Date of Patent: Jan. 21, 2025

(54) LIGNIN COMPOSITION

(71) Applicant: KØBENHAVNS UNIVERSITET, København K (DK)

(72) Inventor: Yohanna Cabrera Orozco, København K (DK)

(73) Assignee: KØBENHAVNS UNIVERSITET, København K (DK)

( * ) Notice: Subject to any disclaimer, the term of this patent is extended or adjusted under 35 U.S.C. 154(b) by 0 days.

(21) Appl. No.: 18/326,593

(22) Filed: May 31, 2023

(65) Prior Publication Data

US 2023/0304222 A1 Sep. 28, 2023

Related U.S. Application Data

(63) Continuation of application No. PCT/EP2021/082565, filed on Nov. 22, 2021.

(30) Foreign Application Priority Data

Dec. 1, 2020 (EP) .................................... 20211032

(51) Int. Cl.
*D21C 11/00* (2006.01)
*C08L 97/00* (2006.01)
*C10L 5/40* (2006.01)

(52) U.S. Cl.
CPC ........ *D21C 11/0007* (2013.01); *C08L 97/005* (2013.01); *C10L 5/403* (2013.01); *C08L 2201/56* (2013.01); *C10L 2200/0469* (2013.01)

(58) Field of Classification Search
CPC ............... D21C 11/0007; C08L 97/005; C08L 2201/56; C10L 5/403; C10L 2200/0469; C07G 1/00
See application file for complete search history.

(56) References Cited

U.S. PATENT DOCUMENTS 5,478,366 A   12/1995  Teo et al.
5,735,916 A    4/1998  Lucas et al.
(Continued)

FOREIGN PATENT DOCUMENTS

WO   2009116070 A2   9/2009
WO   2010037178 A1   4/2010
(Continued)

OTHER PUBLICATIONS

International Search Report and Written Opinion dated Feb. 23, 2022 for International Application No. PCT/EP2021/082565.
(Continued)

*Primary Examiner* — Ellen M McAvoy
(74) *Attorney, Agent, or Firm* — EIP US LLP

(57) ABSTRACT

The present invention relates to a process for producing a lignin composition, which process comprises:
  providing a lignin slurry comprising water and a water miscible organic solvent;
  subjecting the lignin slurry to extraction at an extraction temperature of less than 100° C. for an extraction time of at least 1 minute to provide an extracted slurry;
  removing liquid from the extracted slurry to provide an extracted lignin; and
  suspending the extracted lignin in a polar organic solvent to provide a lignin composition having a dry matter content of at least 30% by weight.
The present invention also relates to a lignin composition comprising hardwood Kraft lignin and a polar organic solvent, which composition has a dry matter content of at least 30% by weight. The present invention also relates to use of the lignin composition as a fuel.

11 Claims, 5 Drawing Sheets

(56) References Cited

U.S. PATENT DOCUMENTS

| | | | |
|---|---|---|---|
| 2009/0062516 A1* | 3/2009 | Belanger | C13K 13/00 |
| | | | 530/502 |
| 2015/0361266 A1* | 12/2015 | Samec | C10L 1/02 |
| | | | 252/406 |
| 2016/0031921 A1 | 2/2016 | Manesh et al. | |
| 2017/0015792 A1* | 1/2017 | Samec | C10G 1/065 |
| 2017/0226330 A1* | 8/2017 | Knudsen | C12P 19/04 |
| 2019/0241595 A1* | 8/2019 | Dahlstrand | C08L 97/005 |
| 2020/0283684 A1* | 9/2020 | Kouris | C10L 1/026 |
| 2020/0399549 A1* | 12/2020 | Felby | D21C 3/20 |

FOREIGN PATENT DOCUMENTS

| | | |
|---|---|---|
| WO | 2011117705 A2 | 9/2011 |
| WO | 2011131144 A1 | 10/2011 |
| WO | 2013005104 A2 | 1/2013 |
| WO | 2014126471 A1 | 8/2014 |
| WO | 2015080660 A1 | 6/2015 |
| WO | 2016023563 A1 | 2/2016 |
| WO | 2017108055 A1 | 6/2017 |
| WO | 2019053287 A1 | 3/2019 |
| WO | 2019158752 A1 | 8/2019 |

OTHER PUBLICATIONS

European Extended Search Report dated May 11, 2021 for European Application No. 20211032.6.

Cabrera et al: "Purification of Biorefinery Lignin with Alcohols", Journal of Wood Chemistry and Technology, Mar. 1, 2016.

Larsen et al: "Inbicon makes lignocellulosic ethanol a commercial reality" (vol. 46, 2012, pp. 36-45), Apr. 20, 2012.

Hansen et al: "Structural and chemical analysis of process residue from biochemical conversion of wheat straw (*Triticum aestivum* L.) to ethanol", vol. 56, 2013, pp. 572-581, Jul. 4, 2013.

Ma Jesus De La Torre et al: "Organosolv lignin for biofuel", Industrial Crops and Products (2013), vol. 45, pp. 58-63, Dec. 2, 2012.

Nielsen, J. B et al: "Valorization of lignin from biorefineries for fuels and chemicals", Jan. 1, 2016.

* cited by examiner

LIGNIN COMPOSITION

CROSS-REFERENCE TO RELATED APPLICATIONS

This application is a continuation under 35 U.S.C. § 120 of International Application No. PCT/EP2021/082565, filed Nov. 22, 2021, which claims priority to European Application No. EP 20211032.6, filed Dec. 1, 2020, under 35 U.S.C. § 119(a). Each of the above-referenced patent applications is incorporated by reference in its entirety.

BACKGROUND

Field of the Invention

The present invention relates to a process for producing a lignin composition, a lignin composition as such and use of the lignin composition as a fuel. The lignin composition of the invention is suitable for use as a low-cost biofuel, for example in combustion engines with large tolerances to fuel quality, such as low-speed two-stroke engines for the shipping industry.

The production of fuels from biomass (biofuels) has the potential to decrease our dependency on fossil fuels and the environmental impacts stemming therefrom. Biofuels have become of interest to the maritime industry as a means to reduce the heavy dependency on low-grade fossil fuels and associated high environmental loads. The marine sector is facing a number of challenges in combatting its environmental impact; in particular its dependency on waste oil from the crude oil refining industry with its high contents of sulphuric compounds and badly combustible compounds with propensity for particle sooting. Particle and SOx-emissions can be reduced by switching to low-sulphur fuels or by installing on-board scrubbers. However, to substantially reduce or eliminate fossil fuel $CO_2$-emissions, new carbon neutral fuels, such as biofuels, are needed.

Lignin-containing biomass is an important starting material for biofuels, and several examples of processing of such biomass to produce liquid fuels exist. For example, WO 2015/080660 discloses a process for depolymerising lignin from biomass using a transition metal catalyst and using this process for fuel production.

WO 2009/116070 discloses a process for converting agro-waste biomass to liquid biofuels. The process is a three-stage sequential hydrolysis process wherein each of the major components, hemicellulose, lignin and cellulose, are obtained as separate product streams that can be individually transformed further by concurrent processing steps and ultimately recombined to yield the desired liquid biofuel. The transformation of lignin to a form highly soluble in ethanol is central to the process.

US 2016/031921 discloses an oxygen assisted organosolv process for delignification of lignocellulosic biomass materials. A lignocellulosic biomass is contacted with an oxidant to impregnate the biomass, and the impregnated biomass is acidified before forming an aqueous slurry of the biomass. The oxidant and acidification are thought to break the cellulose walls and expose more lignin to a lignin dissolving chemical that is added to the slurry. The lignin dissolving chemical may be ethanol.

WO 2014/126471 discloses a process for fractionating lignocellulosic biomass. In the process, a biomass is extracted with a liquid comprising at least 20% by weight of an organic solvent below 100° C. The extracted biomass is then treated with a further organic solvent, e.g. a lower alcohol, between 120° C. and 280° C. By performing an extraction with an organic solvent prior to organosolv fractionation a better performance of the organosolv step itself is observed.

WO 2011/117705 discloses a process for the conversion of lignin to liquid hydrocarbons. Lignin is depolymerised by subjecting it to hydrogenolysis in the presence of a catalyst, at a temperature from 250° C. to 350° C. The catalyst can employ palladium, ruthenium, platinum, or nickel on appropriate support materials.

A method of removing ashes from biomasses comprising lignin is described by Cabrera et al. (Journal of Wood Chemistry and Technology, 2016, 25 vol. 36:5, pp. 339-352). In this process, aqueous biorefinery lignin-slurries (about 70% w/w water) are subjected to an organosolv process in ethanol under relatively mild reaction conditions for removal of ashes, and the slurries are subsequently flash-cooled using cold water after ash removal. This results in precipitation of organosolv lignin having a very low ash content, i.e. below 1% w/w based on dry matter.

WO 2019/053287 discloses a process for the production of a crude liquid lignin oil. A lignin-rich solid feedstock is treated in a polar organic solvent in the absence of a reaction promoter at an operating temperature up to 210° C., and an operating pressure below 50 bar.

WO 2019/158752 discloses a process for producing a biofuel composition having total ash below 1% w/w. In the process, a slurry comprising ethanol and a biomass comprising lignin is subjected to an organosolv extraction at a temperature from 100 to 250° C., at a pressure from 10 to 60 bar, for a time not exceeding 24 hours. A precipitate is then removed from the slurry to provide a biofuel. The process is considered to provide lignin in a stable dispersion in an organic solvent, and further the minerals fraction of the originating lignocellulosic biomass is considered to be removed or significantly reduced. It was also found that addition of small amounts of surfactants significantly increases the amount of processed lignin, which can be stably comprised in ethanol.

Even though there are several processes for producing lignin based products, there is still a need for improved and cost-effective processes and products obtained by such processes.

SUMMARY

It is an object of the present invention to provide a simplified and improved process for producing a lignin composition. By using the present invention it is possible to conduct the process, and in particular a step of the process in which a lignin slurry is subjected to extraction, at a low temperature, and optionally a low pressure. Hereby the equipment, e.g. reactors, extraction vessels, pipes, pumps, rubber sealings, etc., used in the process of the invention can be simpler and cheaper as there is no need for subjecting the equipment and the lignin slurry present therein or in contact with the equipment to a high temperature and/or high pressure. Conducting the process at a lower temperature means reducing undesired condensations reactions of the lignin feedstock that may take place at higher temperatures as well as extracting lignin fractions of different chemical characteristics. Conducting the process at a lower temperature also means less heating and lower energy consumption, thus both technical and economic advantages, thus a simplified, cost-effective and improved process.

It is a further object of the present invention to provide a process for producing a lignin composition that is stable at a high dry matter content, in particular over an extended period of time. By using the process of the invention it is possible to provide a lignin composition which can be easily and safely handled for various uses, e.g. as a fuel. A stable lignin composition means less risk of settling and clogging on storage and use.

It is yet another object of the present invention to provide a simplified and improved process in which a lignin starting material is converted to a lignin composition in a high yield, even though the lignin has not been treated at a high temperature.

It is yet another object of the invention to provide a high-yield process, which can be carried out at a low temperature, and optionally a low pressure, for producing a stable lignin composition having a high dry matter content and high calorific value, which is suitable for use as a fuel. Hereby the present invention provides significant technical, environmental and economic advantages.

It is yet another object of the invention to provide a lignin composition having a high dry matter content, in particular a lignin composition having a high dry matter content and high stability. A stable lignin composition means less risk of settling and clogging on storage and use.

It is yet another object of the invention to provide a suitable use of the lignin composition of the invention.

Accordingly, in one aspect, the present invention relates to a process for producing a lignin composition, which process comprises:
  providing a lignin slurry comprising water and a water miscible organic solvent;
  subjecting the lignin slurry to extraction at an extraction temperature of less than 100° C. for an extraction time of at least 1 minute to provide an extracted slurry;
  removing liquid from the extracted slurry to provide an extracted lignin; and
  suspending the extracted lignin in a polar organic solvent to provide a lignin composition having a dry matter content of at least 30% by weight.

In another aspect, examples of the present disclosure relate to a process for producing a lignin composition, the process comprising:
  providing a lignin slurry comprising water and a water-miscible organic solvent, wherein the lignin slurry has a solid-to-liquid ratio of 1 to less than 2 (1: <2);
  subjecting the lignin slurry to extraction at an extraction temperature of less than 100° C. for an extraction time of at least 20 minutes to provide an extracted slurry; and
  separating the extracted slurry into a heavy fraction and a light fraction, wherein the light fraction comprises an extracted lignin; and
  suspending the extracted lignin in a polar organic solvent to provide a lignin composition having a dry matter content of at least 30% by weight.

All solid-to-liquid ratios described herein are weight (w/w) ratios of the solid fraction and the liquid fraction, unless otherwise specified. In examples, the lignin slurry has a solid to liquid ratio of from 1:1 to 1:<2, or from 1:1 to 1:1.75, or from 1:1 to 1:1.5. In examples, the lignin slurry has a solid to liquid ratio of 1 to 1.5, or 1 to less than 1.5 (1:<1.5).

Surprisingly, the inventor has identified that examples of processes according to this aspect can provide a lignin composition suitable for use as a fuel, without carrying out a step of removing liquid from the extracted lignin (e.g. the need to concentrate the extracted lignin is obviated). Accordingly, examples of these processes are more energy-efficient than processes which include removing liquid from the extracted lignin, and therefore are less expensive to perform.

In examples of this aspect, the process does not include substantially removing liquid from the extracted slurry to provide the extracted lignin; the light fraction which comprises the extracted lignin is not concentrated before the extracted lignin is suspended in the polar organic solvent to provide a lignin composition suitable for use as a fuel. For example, the process does not include evaporating liquid from the extracted slurry, e.g. by rotary evaporation, flash evaporation, or distillation, either at reduced pressure (vacuum distillation) or atmospheric pressure (atmospheric distillation), and thus examples of the process are more energy-efficient than processes which include evaporating liquid from the extracted lignin, and therefore are less expensive to perform.

According to this aspect, the extracted slurry is separated into a heavy fraction and a light fraction, and the light fraction comprising the extracted lignin is retained. The heavy fraction is typically a phase that contains a significant amount of particulate material, e.g. a solid or precipitate. For example, the heavy fraction is a solid phase. The light fraction is typically a liquid phase, liquid-like phase, or structured liquid phase that contains a higher amount of dispersible particulate material. In examples, both the light fraction and the heavy fraction contain particles of lignin. The heavy fraction typically comprises particles of heavier weight than the light fraction. In examples, the lignin particles in the heavy fraction have a greater number average molecular weight distribution and/or weight average molecular weight distribution than the lignin particles in the light fraction.

The separation of the extracted slurry according to examples of this aspect is carried out according to any suitable method, e.g. centrifugation, filtration, decanting, settling, membrane separation, or any combination thereof. In examples, the separating comprises filtration and/or centrifugation. Typically, the separation according to examples of this aspect does not include substantially removing liquid from the extracted slurry to provide the extracted lignin. The separation according to examples of this aspect comprises removing at least part of the solid matter of the extracted slurry to provide a light fraction comprising extracted lignin. In examples, the separating the extracted slurry comprises centrifugation of the extracted slurry to separate a light fraction (e.g. supernatant) from a heavy fraction (e.g. precipitate), wherein the supernatant comprises the extracted lignin. For example, at least some particles of heavier weight are removed from the extracted slurry to provide the light fraction comprising the extracted lignin. Without wishing to be bound by theory, it is believed that the separation (e.g. centrifugation) modifies the surface properties of the lignin particles in the slurry, to provide an extracted lignin capable of remaining stable in water-miscible organic solvents. For example, the extracted lignin typically has a more oil-like consistency than the lignin slurry. In examples, the extracted slurry is separated into a heavy fraction and a light fraction, wherein the light fraction comprises extracted lignin having improved stability when suspended in organic solvents compared with the extracted slurry.

In another aspect, examples of the present disclosure relate to a lignin composition obtainable any of the methods described above, e.g. a lignin composition obtained from any of the methods described above.

In another aspect, the present invention relates to a lignin composition comprising hardwood Kraft lignin and a polar organic solvent, which composition has a dry matter content of least 30% by weight. In yet another aspect, the present invention relates to use of the lignin composition as a fuel.

In another aspect, examples of the present disclosure include a composition comprising processed lignin and a polar solvent. In examples, the polar solvent comprises, consists essentially or, or consists of, ethanol, methanol, and/or water. In examples, the processed lignin derives from alkaline lignin, organosolv lignin, kraft lignin, and/or biorefinery lignin.

Features described herein in relation to one aspect of the present disclosure are explicitly disclosed in combination with the other aspects, to the extent that they are compatible.

These and other objects and aspects of the invention are described in further detail hereinafter.

BRIEF DESCRIPTION OF THE DRAWINGS

FIGS. 1 and 3 are charts relating to examples of prior art;
FIGS. 2 and 4 are charts relating to examples according to the present disclosure.
FIGS. 5 and 7 are charts relating to examples of prior art;
FIGS. 6 and 8 are charts relating to examples according to the present disclosure.

DETAILED DESCRIPTION

Figures 1, 2:
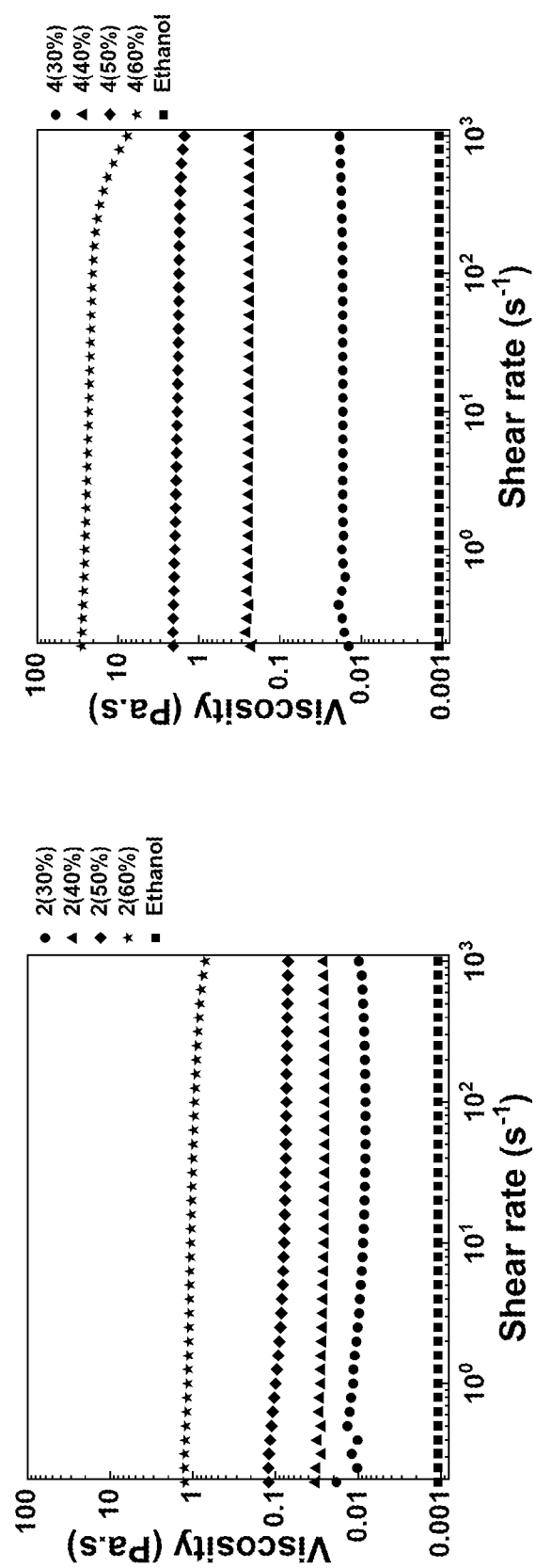
FIGS. 1 to 4 are charts depicting the viscosity of lignin compositions across a range of shear rates.
Figure 4:
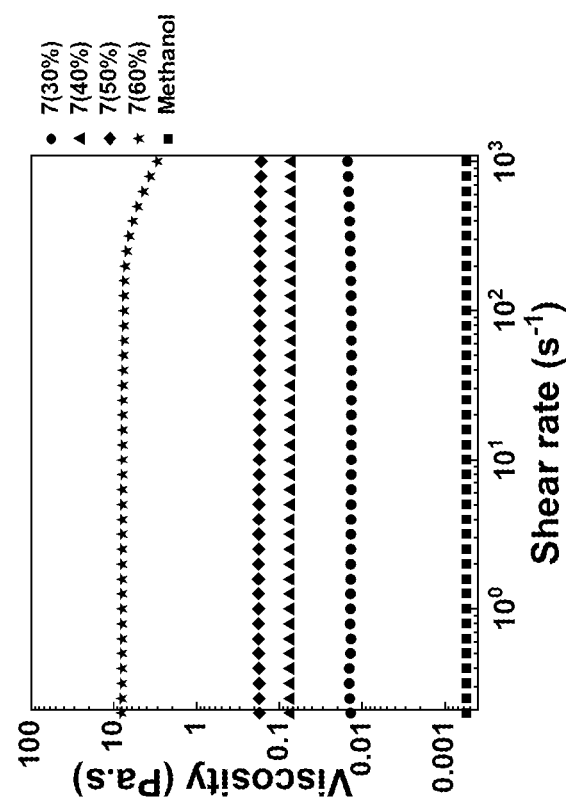
Figure 3:
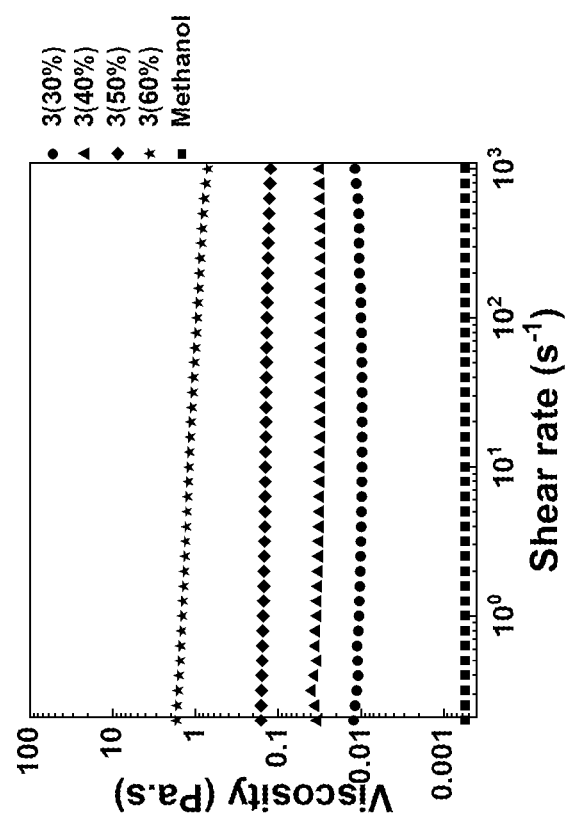
Figure 6:
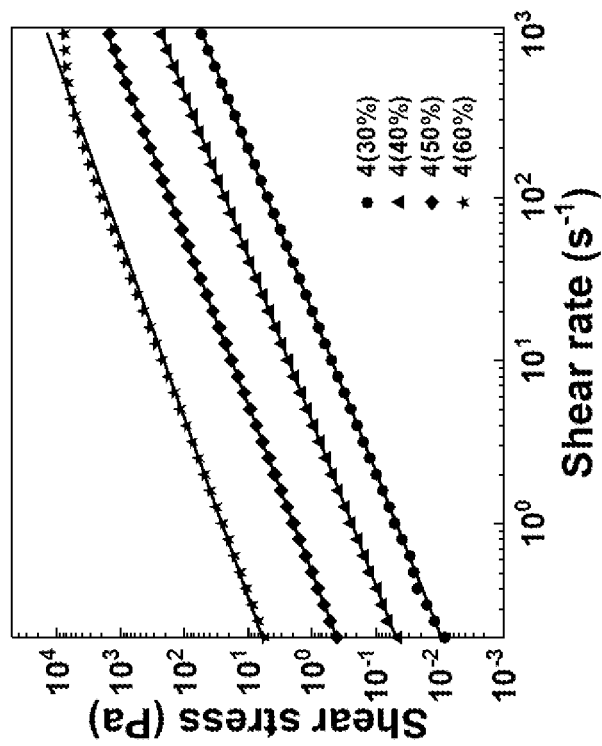
FIGS. 5 to 8 are charts depicting the shear stress of lignin compositions across a range of shear rates.
Figure 5:
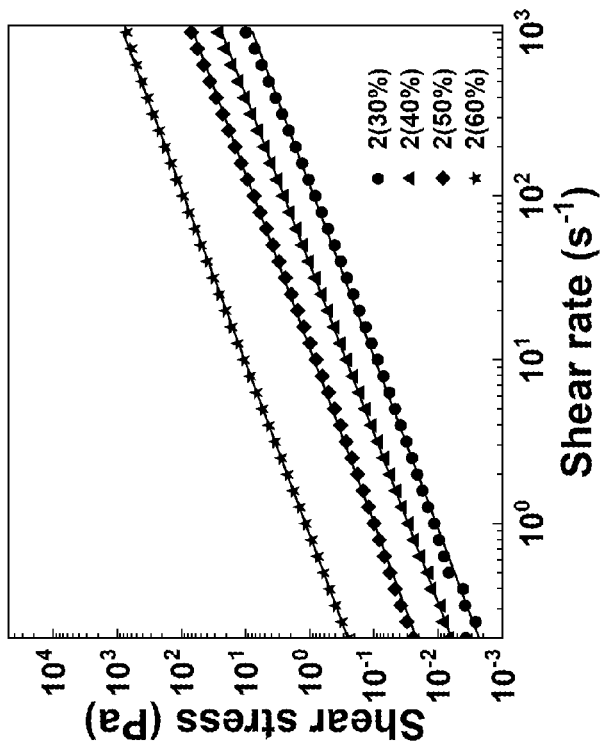
Figure 8:
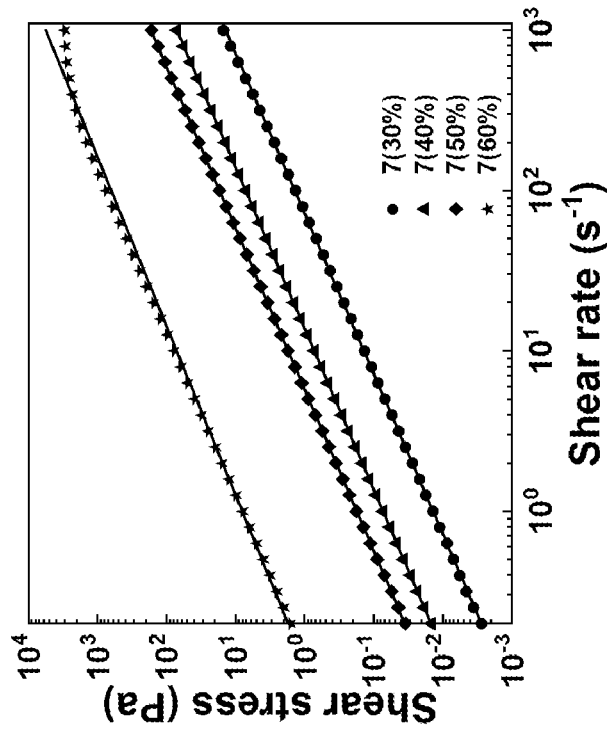
Figure 7:
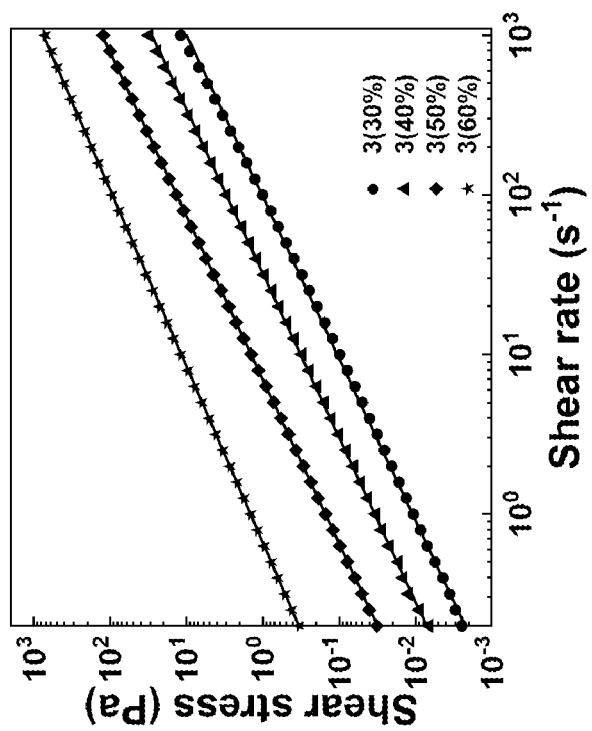

The process of the present invention comprises the use of a lignin, i.e. a lignin-containing material. The starting material for use in the process of the invention is also referred to herein as a lignin feedstock, or a lignin starting material.

Lignin is a heterogeneous biopolymer, which is a structural material in many plants, and any lignin containing plant may be used to provide the lignin-containing material for use in the process of the invention. Hereby the lignin of the invention can be considered to be a lignin-containing biomass. Examples of suitable plants containing lignin include grasses, e.g. wheat, rice, barley, oats, rye, sugarcane, etc.: legumes, e.g. soy, peas, beans, lentils, alfalfa, clover, lupins, mesquite, carob, peanuts, and tamarind: other crops, e.g. corn, waste from the processing of fruits, plants used for fibres for fabrics or textiles, e.g. cotton, hemp, linen, and trees, such as trees commonly used for pulp and paper production and lumber or timber, including waste from forestry, e.g. softwood or hardwood. Examples of preferred lignins include grasses, e.g. wheat straw.

Any lignin derived from second generation bioethanol fermentation, pulp and paper manufacture, processing of wood and other lignocellulosic materials and other sources can be used in the process of the invention. Production of cellulosic pulp from wood usually generates a waste stream enriched in lignins and such a waste stream may be used in the process of the invention, whereby the lignin suitably is derived from a Kraft process, sulphite process or soda process; preferably the soda process.

The lignin for use in the process of the invention may be selected from native lignins, processed lignins, chemically modified lignins, compositions comprising lignin, and combinations thereof. Such lignins and lignin compositions usually contain more than 50% by weight of lignin, or more than 90% by weight of lignin, based on dry matter, and may also contain carbohydrates, e.g. cellulose, hemicellulose, pectin, etc., and other components, e.g. waxes, terpenes and lipids.

If desired, the carbohydrate content of the lignins and lignin compositions may be reduced, e.g. by separating lignin from carbohydrates, by any method known in the art prior to subjecting the lignin feedstock to the process of the invention. The reduction of the carbohydrate content will increase the calorific value of the lignin composition obtained by the invention. Examples of suitable such methods include subjecting the lignin to enzymatic treatment, e.g. using cellulases and/or hemicellulases, to convert non-soluble carbohydrates, e.g. cellulose and hemicellulose, to fermentable, and soluble, sugars. Cellulase treatment of plant material pre-treated for fermentation is commonly used in the preparation of feedstocks for second generation bioethanol fermentation, and when the pre-treated plant material has been treated with enzymes, the material may be referred to as "biorefinery lignin". Biorefinery lignin, e.g. a lignin derived from a hardwood, softwood or wheat straw biorefinery process, is also a suitable lignin for use in the process of the invention.

According to the invention, the lignin used in the process may be depolymerised or non-depolymerised lignin. The Kraft process and the sulphite process generally provide a depolymerised lignin, which may have a higher water-solubility than other lignin types. A lignin that is suitably used in the process may be derived from a hardwood Kraft process. A non-depolymerised lignin, i.e. a lignin not subjected to depolymerisation, can be obtained in a hydrothermal treatment. An appropriate hydrothermal treatment is commonly used in the pre-treatment of plant materials for second generation bioethanol fermentation. A commonly employed hydrothermal treatment for second generation bioethanol fermentation is referred to as a "steam explosion" of the plant material. Lignin and lignocellulosic material treated in a steam explosion may be referred to as "steam exploded" in the context of the invention. Steam exploded lignin is also a preferred lignin for use in the process of the invention as, in examples, it has low content of ashes, e.g. below 1% by weight. A lignin that is suitably used in the process may be obtained from a wheat straw soda process.

Examples of commercially available lignins that can be used in the process of the invention include dry lignins marketed under the tradename Protobind by Phytaxis AG, Switzerland, e.g. Protobind 1000, Protobind 2000, Protobind 2400, Protobind 6000, etc. Protobind 1000 is prepared from wheat straw in a soda process.

In examples, the lignin used in the process comprises alkaline lignin (e.g. lignin deriving from a soda process), organosolv lignin (e.g. lignin deriving from an organosolv lignin), Kraft lignin (e.g. lignin deriving from the Kraft process), and/or biorefinery lignin.

The process of the present invention comprises providing a lignin slurry comprising water and water miscible organic solvent. The lignin slurry contains particles of lignin suspended in water and water miscible organic solvent, and the slurry may also be referred to as a suspension comprising lignin, water and water miscible organic solvent. The lignin slurry may have a weight ratio of water to water miscible organic solvent of from 10:1, or from 5:1 or from 2:1, or from 1:1, or from 1:2, to 1:5, or to 1:10, or to 1:20, or to 1:30, or to 1:40, or to 1:50; suitably the weight ratio of water to water miscible organic solvent is from 1:1 to 1:40, preferably 1:2 to 1:30, or 1:2 to 1:10, or 1:4 to 1:10. The lignin slurry may have a dry matter content of at least 20% by weight, usually from 30 to 50% by weight. In examples, the ratio of solid to liquid in the lignin slurry is from 1:1 to 1:10, or 1:1 to 1:5. In examples, the ratio of solid to liquid in the lignin slurry is approximately 1:5, 1:2, 1:1.5, or 1:1.15. In particular examples, the ratio of solid to liquid in the lignin slurry is approximately 1:5, and the liquid comprises ethanol and water. In other examples, the ratio of solid to liquid in the lignin slurry is approximately 1:2, and the liquid comprises methanol and water. The dry matter comprises the lignin, any residual carbohydrates, e.g. cellulose and/or hemicellulose, and any mineral salts that may form ashes.

In the context of the present invention, a "water miscible organic solvent" is any organic solvent that is miscible with water, and any water miscible organic solvent can be used in the process. Examples of suitable water miscible organic solvent include polar organic solvents such as alcohols, ethers, esters and mixtures thereof, preferably alcohols. Examples of suitable alcohols include methanol, ethanol, n-propanol, i-propanol, t-butanol, i-butanol, phenol, diols, e.g. ethylene glycol, diethylene glycol, triethylene glycol, tetraethylene glycol, propylene glycol, dipropylene glycol, tripropylene glycol, 1,3-propanediol, butanediol, hexanediol, glycerol, and mixtures thereof, preferably methanol, ethanol and mixtures thereof.

The lignin slurry can be formed by mixing the lignin, water and water miscible organic solvent in any order. For example, a dry lignin may be suspended in water to obtain an aqueous lignin slurry having a desired water content. Some water may be present in the lignin to be used. Some water may also be present in the water miscible organic solvent to be used. The lignin slurry may be formed by mixing a composition comprising lignin and water, e.g. an aqueous lignin slurry, with a water miscible organic solvent, optionally containing water. The lignin slurry may also be formed by mixing lignin with a water miscible organic solvent and water. Preferably, a water miscible organic solvent containing water is used. An additional amount of lignin may be suspended in the lignin slurry, and an additional amount of water and/or water soluble organic solvent may be added to the lignin slurry, to obtain a desired weight ratio of water to water miscible organic solvent and a desired dry matter content.

When using an aqueous lignin slurry, it may have a water content varying within wide limits, e.g. from 1 to 99% by weight, usually from 5% by weight, or from 10% by weight, suitably from 20% by weight, or from 30% by weight, up to 40% by weight, suitably up to 50% by weight, or 70% by weight; suitably the water content is in the range of from 20 to 50% by weight. Accordingly, the aqueous lignin slurry may have a dry matter content of from 1 to 99% by weight, usually from 30% by weight, suitably from 50% by weight, or from 60% by weight, up to 70% by weight, suitably up to 80% by weight, or up to 90% by weight, usually up to 95% by weight; suitably the dry matter content is in a range of from 50 to 80% by weight.

In examples, the lignin slurry is formed by suspending the dry lignin in water-miscible organic solvent, or suspending the dry lignin in a mixture of water and water-miscible organic solvent. In examples, the lignin slurry is formed by gradually adding dry lignin to the water and/or water-miscible organic solvent over a period of time. For example, aliquots of dry lignin are supplied to the water and/or water-miscible organic solvent over a period of 10 minutes, 30 minutes, or an hour. Alternatively, or additionally, aliquots of dry lignin are supplied to the water and/or water-miscible organic solvent every 5 minutes, 10 minutes, or 30 minutes until the total amount of dry lignin to be mixed with the water and/or water-miscible organic solvent has been supplied to the water and/or water-miscible organic solvent.

In the process of the invention, prior to providing the lignin slurry, the lignin may be subjected to washing with a washing liquid. Preferably, the washing liquid comprises or is water. For example, the dry lignin or lignin of the aqueous lignin slurry may be subjected to washing with the washing liquid. Water may be removed from the aqueous lignin slurry by centrifugation, filtration, evaporation, and a combination thereof. Washing can be done by settling lignin from the aqueous lignin slurry, e.g. by centrifugation, to provide a lignin pellet, removing water from the lignin pellet and suspending the lignin pellet in water. Such washing may be repeated. Another method of washing comprises washing dry lignin with a washing liquid, e.g. on a filter. Washing with a washing liquid such as water allows removal of minerals, e.g. mineral salts, from the dry lignin or aqueous lignin slurry. Preferably, after washing, the dry lignin, aqueous lignin slurry, and the slurry comprising lignin, water and water miscible organic solvent, have a content of ashes of less than 1% by weight, based on the weight of the dry matter.

The pH of the aqueous lignin slurry and lignin slurry comprising water and water miscible organic solvent may reflect the origin of the lignin feedstock. The pH may be adjusted by adding a pH adjusting agent to the aqueous lignin slurry and/or the lignin slurry comprising water and water miscible organic solvent. This may be done to reduce or increase the pH, to bring the pH close to neutral or to basic or alkaline conditions, which may favour lignin dissolution. Examples of pH adjusting agents include sodium hydroxide, ammonia and organic amines. In one embodiment, the pH is adjusted by adding a pH adjusting agent to the aqueous lignin slurry and/or the lignin slurry comprising water and water miscible organic solvent. In another embodiment, the pH is not adjusted by adding a pH adjusting agent. Instead, it is possible to adjust the pH, and bring it close to neutral, by subjecting the lignin slurry to washing using water as the washing liquid.

The process of the present invention comprises subjecting the lignin slurry to extraction at an extraction temperature of less than 100° C. for an extraction time of at least 1 minute to provide an extracted slurry. In the extraction, the lignin of the slurry is subjected to extraction with the mixture of water and water miscible organic solvent. The extraction temperature is less than 100° C. and may be up to 95° C., or up to 75° C., or up to 50° C., and the extraction temperature may be at least 0° C., usually at least 5° C., or at least 10° C. In examples, the extraction takes place at a temperature of from 10° C. to 100° C., 10° C. to 90° C., 10° C. to 80° C., 10° C. to 70° C., 10° C. to 50° C., or 10° C. to 40° C. Preferably, the extraction takes place at ambient temperature, e.g. a temperature in the range of 10 to 40° C., or 10° C. to 30° C. The pressure during the extraction is not important. In examples, the extraction is performed at a pressure of less than 30 bar, 20 bar, 10 bar, 8 bar, 5 bar, 4 bar, 3 bar, 2 bar, or at ambient or atmospheric pressure (e.g. approximately 1 bar). The extraction is usually performed at a pressure of less than 2 bar (e.g. from 0.8 bar to 2 bar), preferably at ambient or atmospheric pressure. The duration of the extraction can be chosen freely and the extraction time is usually at least 1 minute in order to allow the slurry comprising lignin, water and the water miscible organic solvent to mix properly. In examples, the extraction time is at least 20 minutes, 40 minutes, or 60 minutes. The extraction may be completed at an extraction time of 60 minutes, although the extraction time may be extended. For example, the extraction time is equal to or less than 60 minutes, 120 minutes, 180 minutes, 12 hours, 18 hours, or 24 hours, as desired. In examples, the extraction time is from 20 minutes to 24 hours, or from 40 minutes to 18 hours, or from 40 minutes to 180 minutes. During the extraction, the slurry is preferably mixed thoroughly, e.g. by vigorous stirring. The extracted slurry comprises comprising lignin, water and a water miscible organic solvent.

When the slurry is subjected to extraction, the extracted slurry formed may contain a heavy fraction of lignin, usually a phase that contains a significant amount of and is enriched in particulate material, e.g. a solid or precipitate, and a light fraction of lignin, usually a liquid phase that may contain a smaller amount of particulate material. A large portion of any minerals present may adsorb to the heavy fraction in preference to adsorption to the light fraction. By separating the heavy fraction of lignin, e.g. containing a precipitate, from the light fraction of lignin it is possible to reduce the mineral content of the lignin. The process of the invention preferably comprises separating the heavy fraction from the light fraction, e.g. by centrifugation, filtration, decanting, settling, membrane separation, flash evaporation, and a combination thereof, suitably centrifugation or filtration, whereby the extracted slurry will contain the light fraction of lignin.

In examples according to one aspect, the process of the invention comprises removing at least part of the liquid from the extracted slurry to provide an extracted lignin. The liquid comprises water and water miscible organic solvent. Any process of removing liquid from the extracted slurry may be used, and the removal of liquid may take place at any temperature, pressure and time as suitable for the water miscible organic solvent. Examples of suitable processes for removing the liquid from the extracted liquid include evaporation, optionally at a reduced pressure, e.g. rotary evaporation, flash evaporation, distillation, either at reduced pressure (vacuum distillation) or atmospheric pressure (atmospheric distillation). Usually the liquid is removed at a temperature of less than 100° C., or less than 95° C., or less than 75° C., or less than 60° C. Preferably, the liquid is removed by evaporation, either at a reduced or atmospheric pressure, and preferably liquid is removed at a temperature in the range of from 10 to 75° C., preferably from 30 to 60° C. Removing liquid from the extracted slurry at a temperature within these ranges makes it possible to provide an extracted lignin which is or can be easily suspended in a polar organic solvent to provide a stable high-concentration lignin composition. Moreover, removal of the liquid by evaporation is preferred in the sense that when the extracted lignin is suspended in the polar organic solvent, the suspension may be achieved faster than when the liquid is removed by other methods. Removing liquid from the extracted slurry may take place for up to 180 min, usually up to 120 min and suitable up to 60 min. The removal of liquid from the extracted slurry takes place to provide an extracted lignin that may have a dry matter content of from 30 to 90% by weight, usually from 30 to 80% by weight, suitable from 35 to 75% by weight, or from 40 to 70% by weight.

Preferably, after the removal of liquid from the extracted slurry, the water miscible organic solvent is separated from the water, e.g. by distillation or vacuum distillation, and the water miscible organic solvent is recycled in the process to provide a lignin slurry comprising water and a water miscible organic solvent. A water miscible organic solvent at a eutectic concentration in water, e.g. methanol or ethanol, is an example of a preferred water miscible organic solvent since it can easily be recycled in the process.

The extracted lignin may be subjected to washing with a water miscible organic solvent, preferably the same water miscible organic solvent used in providing the slurry and subjected to extraction, in order to further reduce the water content of the extracted lignin. Usually, the washing will include suspending the extracted lignin in water miscible organic solvent followed by settling of the extracted lignin, e.g. using a centrifuge, and separation of a liquid phase containing the water miscible organic solvent.

The process of the invention comprises suspending the extracted lignin in a polar organic solvent to provide a lignin composition and the term "suspending", as used herein, is not considered to be limiting in the context of the invention. Thus, suspending the extracted lignin in a polar organic solvent is meant to include that the extracted lignin, and different components thereof, may be suspended, distributed, dissolved, solvated, solvable and/or soluble in the polar organic solvent. The extracted lignin may be suspended in the polar organic solvent by mixing or stirring, optionally thoroughly, e.g. vigorous stirring. Any polar organic solvent may be used in the process. The polar organic solvent may or may not be water-miscible. The polar organic solvent may be the same as or different from the water miscible organic solvent used in the process. Example of suitable polar organic solvent include alcohols, esters, ethers and mixtures thereof, preferably alcohols. Examples of suitable alcohols include methanol, ethanol, n-propanol, i-propanol, t-butanol, i-butanol, phenol, diols, e.g. ethylene glycol, diethylene glycol, triethylene glycol, tetraethylene glycol, propylene glycol, dipropylene glycol, tripropylene glycol, 1,3-propanediol, butanediol, hexanediol, glycerol, and mixtures thereof, preferably methanol, ethanol and mixtures thereof.

The extracted lignin is suspended in the polar organic solvent. The resulting lignin product may appear as and resemble an oil that can be used directly in place of a fossil fuel oil. Usually, the lignin composition obtained by the process of the invention has a dry matter content of at least 30% by weight, suitably at least 35% by weight, and preferably at least 40% by weight. The lignin composition may contain from 30 to 90% by weight of dry matter and from 10 to 70% by weight of polar organic solvent, usually from 30 to 80% by weight of dry matter and from 20 to 70% by weight of polar organic solvent, suitably from 35 to 75% by weight of dry matter and from 25 to 65% by weight of polar organic solvent, preferably from 40 to 70% by weight of dry matter and from 30 to 60% by weight of polar organic solvent. The dry matter is preferably matter derived from lignin, and the dry matter content is preferably the lignin dry matter content. The term dry matter, as used herein, is the dry or solid matter that remains after all of the water and organic solvent are removed. The lignin composition may contain other components, preferably in minor amounts, e.g. carbohydrates, minerals and water. Preferably, the lignin composition has an ash content of less than 1% by weight, based on the weight of the composition.

In examples according to one aspect, the process of the invention comprises steps of removing at least part of the liquid from the extracted slurry to provide an extracted lignin, and suspending the extracted lignin in a polar organic solvent to provide a lignin composition having a dry matter content of at least 30% by weight. In one embodiment, the process steps of "removing" and "suspending" take place essentially consecutively. In another embodiment, the process steps of "removing" and "suspending" take place essentially simultaneously, i.e. as one step, whereby removing at least part of the liquid from the extracted slurry provides an extracted lignin which is essentially simultaneously suspended in a polar organic solvent to provide a lignin composition having a dry matter content of at least 30% by weight. In this embodiment, the polar organic solvent is preferably a water miscible organic solvent, e.g. as defined above. This process step may be defined as removing at least part of the liquid from the extracted slurry to provide a lignin composition comprising a polar organic solvent and having a dry matter content of at least 30% by weight.

In examples according to another aspect, the process of the invention comprises separating the extracted slurry into a heavy fraction (typically a solid precipitate) and a light fraction (typically a liquid phase comprising dispersible particulate matter), the light fraction comprising an extracted lignin, and suspending the extracted lignin in a polar organic solvent to provide a lignin composition having a dry matter content of at least 30% by weight, preferably without substantially removing liquid from the extracted slurry or the light fraction comprising extracted lignin before suspending the extracted lignin in the polar organic solvent. In examples, the "separating" and "suspending" take place essentially simultaneously, whereby separating the heavy fraction from the light fraction provides an extracted lignin which is essentially simultaneously suspended in a polar organic solvent to provide a lignin composition having a dry matter content of at least 30% by weight. For example, the light fraction comprising extracted lignin is the lignin composition. In examples, this part of the process may be defined as removing at least part of the solid matter of the extracted slurry to provide a lignin composition comprising a polar organic solvent and having a dry matter content of at least 30% by weight.

The process of the invention provides a lignin composition in a high yield and the yield may depend on the type of lignin and how it has been treated and/or modified prior to use in the process of the invention. The yield can be seen as the dry matter of the lignin composition obtained in the process based on the dry matter of the lignin starting material used in the process. The yield, in percent, can be calculated as the weight of the dry matter of the lignin composition obtained in the process divided by the weight of the dry matter of the lignin starting material used in the process times 100. The process of the invention may lead to a yield of at least 5%, or at least 10%, or at least 15%, or at least 35%, or at least 40%, up to 90%, or up to 85%, or up to 80%.

The lignin composition provided by the invention may be referred to as an oil or liquid composition comprising lignin. The process of the invention allows production of a stable lignin composition at a high dry matter content whereby the lignin will not sediment over an extended period of time. In general, the lignin composition is stable at a dry matter content in the range of from 30 to 80% by weight. When exposed to freezing temperatures, the viscosity of the lignin composition will increase, e.g. the lignin composition may solidify, but by increasing the temperature, e.g. by reheating, to ambient temperature, the viscosity of the lignin composition will be as prior to freezing and the lignin composition remains stable with no observable effect from the freezing temperature. The lignin composition obtained by the invention is suitable for use as a biofuel, either alone or when blended with other fuels.

The term "stable", as used herein, means that no sediment is permanently formed in the lignin composition on storage for 30 days at a temperature of 5° C. In stable lignin compositions, no sediment will be formed under such conditions of time and temperature. Stable lignin compositions also include lignin compositions in which a non-permanent, or temporary, sediment is formed on storage for 30 days at a temperature of 5° C., wherein the non-permanent sediment can be suspended. Whether a sediment is permanent or non-permanent is determined by subjecting a lignin composition containing a sediment to vigorous stirring, e.g. vortexing, for up to 1 minute. If the sediment is suspended by such treatment, the lignin composition is considered to be stable; if not, the lignin composition is considered to be unstable. Usually, in stable lignin compositions having a non-permanent sediment, vigorous stirring of the lignin composition for 10 seconds will suspend the sediment.

The present invention may comprise the use of a surfactant and any surfactant known in the art may be used in the process and present in the lignin composition obtained. However, the process of the invention allows formation of a stable lignin composition without the need of using surfactants. Accordingly, in one embodiment, no surfactant is used in the process of the invention or present in the lignin composition obtained. For example, the lignin composition is substantially free of surfactant, and/or the process is substantially free of surfactant.

The present invention further relates to a lignin composition comprising extracted, or "processed" lignin. "Processed" lignin is lignin which has undergone the extraction process as described herein. The processed lignin in a composition corresponds to a fraction of the feedstock lignin present in the slurry used in the extraction process, optionally having undergone some amount of depolymerisation. Typically, any depolymerisation is relatively minor; the processed lignin typically does not comprise a majority of monomers or oligomers. Rather, the processed lignin comprises a majority of polymer chains which, optionally, have a molecular weight smaller than the molecular weight of the feedstock lignin. In examples, the processed lignin has substantially not undergone depolymerisation. For example, the extraction substantially does not depolymerise the feedstock lignin; the processed lignin comprises a fraction of the polymers present in the feedstock lignin, the polymers of the processed lignin having a different number average molecular weight distribution or weight average molecular distribution than the polymers of the feedstock lignin.

In examples, the lignin composition has a dry matter content of at least 30% by weight, or 40%, or 50%, or 60%.

In examples, the lignin composition has a dry matter content of less than 70% by weight, or less than 60% by weight.

In examples, the lignin composition is a biofuel, e.g. is suitable for use as fuel in an internal combustion engine. In particular examples, the lignin composition is a biofuel suitable for use in a two-stroke marine crosshead engine. In examples, the lignin and the polar organic solvent are the main combustible components of the lignin composition. For example, the lignin and the polar organic solvent together are at least 50 wt %, 60 wt %, 70 wt %, 80 wt %, 90 wt %, or substantially all of the combustible components of the lignin composition.

In some examples, compositions having a dry matter content of less than 70%, 60%, or 50% are advantageous as they have viscosities more suitable for injection into an internal combustion engine.

The present invention further relates to a lignin composition comprising hardwood Kraft lignin and a polar organic solvent, which composition has a dry matter content of at least 30% by weight. The lignin present in the lignin composition comprises hardwood Kraft lignin and may also comprise other types of lignin such as, for example, any of the lignins defined above, e.g. lignin from a sulphite process, soda process, second generation bioethanol fermentation process, biorefinery process, cellulase enzyme treated lignin, hemicellulase enzyme treated lignin, and a combination thereof. The lignin composition may have a content of hardwood Kraft lignin of at least 5% by weight, at least 10%, usually at least 25%, or at least 50%, or at least 75%, based on the dry matter of the lignin composition.

The lignin composition of the invention has a dry matter content of least 30% by weight, suitably at least 35% by weight, and preferably at least 40% by weight. The lignin composition may contain from 30 to 90% by weight of dry matter and from 10 to 70% by weight of polar organic solvent, usually from 30 to 80% by weight of dry matter and from 20 to 70% by weight of polar organic solvent, suitably from 35 to 75% by weight of dry matter and from 25 to 65% by weight of polar organic solvent, preferably from 40 to 70% by weight of dry matter and from 30 to 60% by weight of polar organic solvent. The dry matter is preferably matter derived from lignin, and the dry matter content is preferably the lignin dry matter content. The lignin composition may contain other components, preferably in minor amounts, e.g. carbohydrates, minerals and water. Preferably, the lignin composition has an ash content of less than 1% by weight, based on the weight of the composition. The polar organic solvent present in the lignin composition of the invention may be any of the polar organic solvents defined above, preferably an alcohol, and the alcohol is preferably methanol, ethanol or a mixture thereof.

The viscosity of lignin compositions can, for example, be determined with a rheometer. "Viscosity" as used herein refers to the dynamic viscosity of the composition at 25° C. at a shear rate of 1 s$^{-1}$, unless otherwise stated.

In examples, the lignin composition has a viscosity of at least 1 Pa·s (pascal-seconds). For example, the lignin composition has a dry mass content of at least 50% and a viscosity of at least 1 Pa·s. In examples, the lignin composition comprises ethanol, has a dry mass content of at least 50%, and a viscosity of at least 1 Pa·s.

In examples, the lignin composition has a dry matter content of approximately 30% or less, and a viscosity of at least 0.001 Pa·s. In examples, the lignin composition comprises ethanol, has a dry matter content of approximately 30% or less, and a viscosity of at least 0.008 Pa·s. In examples, the lignin composition comprises methanol, has a dry matter content of approximately 30% or less, and a viscosity of at least 0.012 Pa·s.

In examples, the lignin composition has a dry matter content of approximately 40% or less (for example, a dry matter content of from 30% to 40%, or approximately 40%), and a viscosity of at least 0.05 Pa·s. In examples, the lignin composition comprises ethanol, has a dry matter content of approximately 40% or less (for example, a dry matter content of from 30% to 40%, or approximately 40%), and a viscosity of at least 0.1 Pa·s. In examples, the lignin composition comprises methanol, has a dry matter content of approximately 40% or less (for example, a dry matter content of from 30% to 40%, or approximately 40%), and a viscosity of at least 0.05 Pa·s.

In examples, the lignin composition has a dry matter content of approximately 50% or less (for example, a dry matter content of from 40% to 50%, or approximately 50%), and a viscosity of at least 0.15 Pa·s. In examples, the lignin composition comprises ethanol, has a dry matter content of approximately 50% or less (for example, a dry matter content of from 40% to 50%, or approximately 50%), and a viscosity of at least 1 Pa·s. In examples, the lignin composition comprises methanol, has a dry matter content of approximately 50% or less (for example, a dry matter content of from 40% to 50%, or approximately 50%), and a viscosity of at least 0.15 Pa·s.

In examples, the lignin composition has a dry matter content of approximately 60% or less (for example, a dry matter content of from 50% to 60%, or approximately 60%), and a viscosity of at least 2 Pa·s. In examples, the lignin composition comprises ethanol, has a dry matter content of approximately 60% or less (for example, a dry matter content of from 50% to 60%, or approximately 60%), and a viscosity of at least 5 Pa·s. In examples, the lignin composition comprises methanol, has a dry matter content of approximately 60% or less (for example, a dry matter content of from 50% to 60%, or approximately 60%), and a viscosity of at least 2 Pa·s.

The feedstock lignin in the lignin slurry comprising lignin, water, and water-miscible organic solvent, and the lignin (e.g. processed lignin) in the lignin composition provided by the process described herein, each has a molecular weight distribution and dispersity (Đ) in the liquid system. The molecular weight distribution can be represented using the number average molecular weight ($M_n$), and/or the weight average molecular weight ($M_w$).

The number average molecular weight ($M_n$) of the polymer chains of lignin in the system is defined by:

$$M_n = \frac{\sum N_i M_i}{\sum N_i}$$

where $M_i$ is the molecular weight of a chain and $N_i$ is the number of chains of that molecular weight. The $M_n$ can be expressed in Daltons (Da). The $M_n$ of a polymer chains in a system can be determined by, for example, gel permeation chromatography (GPC).

The weight average molecular weight ($M_w$) of the polymer chains of lignin in the system is defined by is defined by:

$$M_w = \frac{\sum N_i M_i^2}{\sum N_i M_i}$$

$M_w$ can be expressed in Daltons (Da). The weight average molecular weight of a system can be determined by, for example, gel permeation chromatography (GPC).

The dispersity (Đ) of the lignin is a measure of the heterogeneity of sizes of lignin molecules in a system. The dispersity is defined by:

$$Đ = \frac{M_w}{M_n}$$

In the process described herein, the extraction typically includes modifying (e.g. shifting) the molecular weight distribution and/or dispersity of the lignin in the system. For example, the molecular weight distribution and/or dispersity of the lignin in the lignin composition provided by the process is greater than, or less than, the molecular weight distribution and/or dispersity respectively of the lignin in the slurry on which the extraction is performed. In examples, the extraction includes reducing the molecular weight distribution of the lignin (e.g. the molecular weight distribution of the processed lignin in the lignin composition is less than the molecular weight distribution of the feedstock lignin in the slurry). In examples, the extraction includes reducing the dispersity of the lignin (e.g. the dispersity of the processed lignin in the lignin composition is less than the dispersity of the feedstock lignin in the slurry). Surprisingly, the inventor has identified that any reduction of the molecular weight distribution accompanying the process described herein is smaller than the reduction of molecular weight distribution observed in corresponding extraction processes known in the art. Without wishing to be bound by theory, it is believed that the more benign reaction conditions employed in the process described herein (e.g. lower temperature and lower pressure) result in a smaller shift in molecular weight distribution and/or dispersity than other lignin extraction processes known in the art.

In examples, the number average molecular weight ($M_n$) of the lignin in the lignin composition provided by the process is greater than or equal to 80% of the $M_n$ of the lignin present in the lignin slurry, or 90%, or 100%.

In examples, the water-miscible organic solvent comprises ethanol, and the $M_n$ of the lignin in the lignin composition provided by the process is greater than or equal to 80% of the $M_n$ of the lignin present in the lignin slurry, or 90%, or 100%.

In examples, the water-miscible organic solvent comprises methanol, and the $M_n$ of the lignin in the lignin composition provided by the process is greater than or equal to 80% of the $M_n$ of the lignin present in the lignin slurry, or 90%, or 100%.

In examples, the weight average molecular weight ($M_w$) of the lignin in the lignin composition provided by the process is greater than or equal to 60% of the $M_w$ of the lignin present in the lignin slurry, or 70%, or 80%, or 90%, or 100%.

In examples, the water-miscible organic solvent comprises ethanol, and the $M_w$ of the lignin in the lignin composition provided by the process is greater than or equal to 60% of the $M_w$ of the lignin present in the lignin slurry, or 70%, or 80%, or 90%, or 100%.

In examples, the water-miscible organic solvent comprises methanol, and the $M_w$ of the lignin in the lignin composition provided by the process is greater than or equal to 60% of the $M_w$ of the lignin present in the lignin slurry, or 70%, or 80%, or 90%, or 100%.

In examples, the dispersity (Đ) of the lignin in the lignin composition provided by the process is greater than or equal to 60% of the dispersity of the lignin present in the lignin slurry, or 70%, or 80%, or 100%.

In examples, the water-miscible organic solvent comprises ethanol, and the dispersity of the lignin in the lignin composition provided by the process is greater than or equal to 70% of the dispersity of the lignin present in the lignin slurry, or 80%, or 90%, or 100%.

In examples, the water-miscible organic solvent comprises methanol, and the dispersity of the lignin in the lignin composition provided by the process is greater than or equal to 60% of the dispersity of the lignin present in the lignin slurry, or 70%, or 80%, or 90%, or 100%.

In examples, the $M_w$ of the lignin in the lignin composition provided by the process is at least 2,000 Da, e.g. from 2,000 to 8,000 Da. In examples, the $M_n$ of the lignin in the lignin composition provided by the process is at least 900 Da, e.g. from 900 Da or 1,000 Da to 2,000 Da. In examples, the dispersity of the lignin in the lignin composition provided by the process is at least 2.5, e.g. from 2.5 to 10.

In examples, the $M_w$ of the feedstock lignin in the lignin slurry is at least 3,000 Da, e.g. from 3,000 to 10,000 Da. In examples, the $M_n$ of the feedstock lignin in the lignin slurry is at least 1,000 Da, e.g. from 1,000 Da to 2,000 Da. In examples, the dispersity of the feedstock lignin in the lignin slurry is at least 2.5, e.g. from 2.5 or 3 to 10.

The present invention also relates to the use of the lignin composition as a fuel. The lignin composition of the invention can be seen as a bio-based material the use thereof as a biofuel. The lignin composition of the invention is suitable for use in a combustion engine of a ship, which usually has large tolerances to fuel quality, such as low-speed two-stroke engines of a ship.

EXAMPLES

The invention is further illustrated in the following examples which, however, are not intended to limit the same. Parts and % relate to parts by weight and % by weight, respectively.

Materials

The following materials were used in the examples, unless otherwise stated:
Protobind PB1000, a dry lignin, dry matter content of 95% be weight, derived from a soda process (Phytaxis AG, CH)
Protobind PB2000, a dry lignin, derived from a soda process (Phytaxis AG, CH)
Protobind PB2400, a dry lignin derived from a soda process (Phytaxis AG, CH)
Protobind PB6000, a dry lignin, derived from a soda process, chemically modified (Phytaxis AG, Switzerland (CH)).
Hardwood Kraft lignin, dry matter content of 95% by weight (Sigma).
Methanol, used as a water miscible organic solvent and/or polar organic solvent, and washing liquid.
Ethanol, used as a water miscible organic solvent and/or polar organic solvent, and washing liquid.
Water, demineralised, used as a washing liquid, to form an aqueous lignin slurry, and to form a pH adjusting agent.
NaOH, 0.1 M, used as a pH adjusting agent.
$NH_3$, 1.32 M, used a pH adjusting agent.

Water Content

Water content was determined using Karl Fischer titration (ASTM: E 203-96).

Lignin Composition Stability

Stability of the lignin compositions produced in the examples was analysed by observing whether the lignin composition contained a sediment, or sedimented material. In this procedure, 10 to 20 ml aliquots of lignin composition was transferred to a 50 mL Falcon tube which was kept at a temperature of 5° C. for a pre-determined period of time (1, 2, 24 or 365 days) before warming the tube to ambient temperature and centrifuging the tube at 765 g (rotor 1180, 1000 rpm) for 10 minutes. The lignin composition was then analysed to find out whether a sediment was present. A lignin composition was considered to be "super stable" when no sediment was present in the centrifuged test tube. A lignin composition was considered to be "stable" if a sediment was present in the centrifuged test tube, which sediment could be suspended by vortexing the centrifuged test tube for 10 seconds. A lignin composition was considered to be "unstable" if a permanent sediment was present in the centrifuged test tube, which sediment could not be suspended by vortexing the centrifuged test tube for 10 seconds.

Dry Matter Content

Dry matter content of a liquid-containing sample was determined by placing the sample in a pre-dried aluminium dish, weighing it and then heating it to 120° C. for 10 minutes to form a dry matter sample. The dry matter content, in percent, was calculated as the weight of the dry matter sample divided by the weight of the liquid-containing sample times 100.

Yield

The yield, in percent, of the process was calculated as the weight of the dry matter of the lignin composition obtained in the process divided by the weight of the dry matter of the lignin starting material used in the process times 100.

Number Average Molecular Weight ($M_n$) and Weight Average Molecular Weight ($M_w$)

The number average molecular weight ($M_n$) and the weight average molecular weight ($M_w$) of lignin in samples were determined through gel permeation chromatography (GPC). GPC was operated on a Shimadzu HPLC system by employing a PLgel 5 μm MiniMIX-C column (250×4.6 mm). HPLC-grade DMSO containing 0.1% lithium chloride was used as eluent (0.2 mL/min, 70° C.). Standard calibration was performed with polystyrene sulfonate standards (Sigma Aldrich, 4.3-2600 kDa) and lignin model compounds (330-640 Da). A total of 8 standards were analysed and interpolated with a $3^{rd}$ order polynomial regression ($R^2$=0.99). The samples were dissolved in HPLC-grade DMSO to reach a final concentration of 2 mg/mL. Each sample was measured in triplicates.

Rheology

Rheological measurements were conducted using a Discovery Hybrid Rheometer (HR—2, TA instruments). A concentric cylinder geometry consisting of cup and bob diameter of 30.37 mm and 27.99 respectively are used. Samples were loaded into the rheometer, and experiments conducted at a shear rate of from 0.2 $s^{-1}$ to 1000 $s^{-1}$ at a constant temperature of 25° C. Ten data points were collected per decade (log scale). Each sample underwent three independent repetitions to ensure the reproducibility of the specific flow behaviour.

Small-Angle X-Ray Scattering and Wide-Angle X-Ray Scattering

Small-angle X-ray scattering (SAXS) and wide-angle X-ray scattering (WAXS) measurements were performed on a SWAXS Nano-inXider instrument (Xenocs, France). The instrument was equipped with two fixed Dectris Pilatus 3 hybrid photon counting detectors for continuous and simultaneous SAXS and WAXS measurements with a sample to detector distance (SDD) of 938 mm for SAXS and 79 mm for WAXS. X-rays having a wavelength of $\lambda$=1.5 Å were used to cover scattering wave vectors ranging from 0.0029 $Å^{-1}$ to 0.37 $Å^{-1}$. Glass capillaries having a wall thickness of 0.01 mm and diameter of 1.5 mm are used to load the samples. All measurements are carried out at a temperature of 25° C.

Example 1

This example illustrates a general procedure for preparing lignin compositions according to the invention.

20 g of dry lignin was suspended in 100 g of water in a pre-weighed centrifuge tube. The mixture was stirred overnight using a magnetic stirrer at 500 rpm. The mixture was then centrifuged at 765 g (rotor 1180, 3000 rpm) for 20 minutes, and the water phase was discharged. After removal of the water, the centrifuge tube and the removed water were weighed, and the remaining aqueous lignin slurry was stirred vigorously. The dry matter content was determined and the water content of the slurry was calculated.

About 100 g of ethanol (water miscible organic solvent) was added to the aqueous lignin slurry to form an extraction mixture, which was stirred magnetically at 1000 rpm for 1 hour at ambient temperature and ambient (atmospheric) pressure.

The extraction mixture was centrifuged at 765 g (rotor 1180, 3000 rpm) for 20 minutes to form a liquid fraction and a precipitate. The liquid fraction was transferred to balloons for rota-evaporation. Rota-evaporation was carried out in sequential steps of 20 min at 50° C., 10 min at 55° C. and 10 min at 60° C. The dry matter content of the intermediate lignin compositions obtained in the centrifugation and rota-evaporation steps were determined, and the solid fraction from the rota-evaporation, i.e. the extracted lignin, was suspended again in about 100 g of 96% ethanol (water miscible organic solvent) to remove water by adding the ethanol while the balloons were rotated without the pump being active at 50° C. Rotation was continued until there was no visible liquid fraction but a visible solid fraction. The last drops of liquid fraction were discharged. The dry matter content of the solid fraction, i.e. extracted lignin, was assessed.

10 to 15 g of ethanol (polar organic solvent) was added to the extracted lignin and then the extracted lignin was suspended in the ethanol by rotation at 50° C. (without vacuum) until a one-phase system was formed. A lignin composition was obtained. The stability of the lignin composition was analysed as described above.

Table 1 shows the results of the lignin compositions obtained by the process when using different lignin starting materials and different amounts of water and water miscible organic solvent, whereby ethanol (96%) was used as both the water miscible organic solvent and polar organic solvent, in which:

Aqueous slurry DMC [%]=dry matter content, in % by weight, of the aqueous lignin slurry formed and later mixed with ethanol (water miscible organic solvent).

Slurry $H_2O$:EtOH=weight ratio of water to ethanol (water miscible organic solvent) present is the lignin slurry formed and subjected to extraction. The dry matter content of the lignin was taken into account.

Lignin composition DMC [%]=dry matter content, in % by weight, of the lignin composition.
n/a=not analysed.

TABLE 1

| Lignin starting material | Aqueous slurry DMC [%] | Slurry H₂O:EtOH | Stability Time [days] 0 | 24 | 365 | Lignin composition DMC [%] |
|---|---|---|---|---|---|---|
| PB1000 | 36 | 1:2.5 | Super Stable | Super Stable | Super Stable | 40 |
| PB1000 | 34 | 1:2.5 | Super Stable | Super Stable | Super Stable | 43 |
| PB2000 | 48 | 1:4 | Stable | Stable | Stable | 44 |
| PB2400 | 53 | 1:4.3 | Super Stable | Stable | Stable | 47 |

As is evident from Table 1, the process of the invention provided stable lignin compositions with a high dry matter content and high stability over an extended period of time.

Example 2

The general procedure according to Example 1 was essentially followed except that the lignin starting material was PB6000.

Table 2 shows the results of the lignin compositions obtained by the process when using PB6000 as the lignin starting material and different amounts of water and ethanol:

TABLE 2

| Lignin starting material | Aqueous slurry DMC [%] | Slurry H₂O:EtOH | Stability Time [days] 0 | 4 | 365 | Lignin composition DMC [%] |
|---|---|---|---|---|---|---|
| PB6000 | 42 | 1:3.6 | Super Stable | n/a | Stable | 41 |
| PB6000 | 36 | 1:3.3 | n/a | n/a | Stable | 43 |

As is evident from Table 2, the process of the invention provided stable lignin compositions with a high dry matter content which were stable over an extended period of time.

Example 3

The general procedure according to Example 1 was essentially followed using Protobind PB 1000 as the lignin starting material. These are designated Tests Nos. 1 to 5. The lignin compositions obtained in Test Nos. 1 to 5 were mixed to form a lignin composition having a dry matter content of 50% by weight.

In other tests, 96% ethanol or 70% ethanol was added directly to the dry lignin to form the extraction mixture, thus no initial water washing of the lignin and no initial formation of an aqueous lignin slurry to which ethanol was added.

When using 96% ethanol, the tests are designated Test Nos. 6 to 10. The lignin compositions obtained in Test Nos. 6 to 10 were mixed to form a lignin composition having a dry matter content of 50% by weight.

When using 70% ethanol, the tests are designated Tests Nos. 11 to 15. The lignin compositions obtained in Test Nos. 6 to 10 were mixed to form a lignin composition having a dry matter content of 50% by weight.

Table 3 shows the results in which an average was calculated from 5 individual tests.

TABLE 3

| Test No. | Ethanol used [%] | Ethanol added to | Slurry H₂O:EtOH | Yield [%] | Lignin composition DMC [%] |
|---|---|---|---|---|---|
| 1 | 96 | Aqueous lignin slurry | About 1:2.5 | 74 | n/a |
| 2 | 96 | Aqueous lignin slurry | About 1:2.5 | 72 | n/a |
| 3 | 96 | Aqueous lignin slurry | About 1:2.5 | 70 | n/a |
| 4 | 96 | Aqueous lignin slurry | About 1:2.5 | 74 | n/a |
| 5 | 96 | Aqueous lignin slurry | About 1:2.5 | 69 | n/a |
| | | | Average: | 72% | 50 |
| 6 | 96 | Dry lignin | About 1:24 | 43 | n/a |
| 7 | 96 | Dry lignin | About 1:24 | 41 | n/a |
| 8 | 96 | Dry lignin | About 1:24 | 41 | n/a |
| 9 | 96 | Dry lignin | About 1:24 | 41 | n/a |
| 10 | 96 | Dry lignin | About 1:24 | 42 | n/a |
| | | | Average: | 41% | 50 |
| 11 | 70 | Dry lignin | About 1:2.5 | 50 | n/a |
| 12 | 70 | Dry lignin | About 1:2.5 | 80 | n/a |
| 13 | 70 | Dry lignin | About 1:2.5 | 71 | n/a |
| 14 | 70 | Dry lignin | About 1:2.5 | 81 | n/a |
| 15 | 70 | Dry lignin | About 1:2.5 | 68 | n/a |
| | | | Average: | 73% | 50 |

As is evident from Table 3, all the process of the invention provided lignin compositions in a high yield and which had a high content of dry matter. A higher yield was generally obtained when the lignin slurry contained more water in relation to the water miscible organic solvent.

Example 4

The general procedure according to Example 3 was essentially followed using Protobind PB1000 as the dry lignin starting material, except that methanol was used as the water miscible organic solvent and polar organic solvent and that methanol was added directly to the dry lignin to form the extraction mixture. Accordingly, no initial water washing of the lignin and no initial formation of an aqueous lignin slurry to which methanol was added. Methanol 90%, methanol 80%, and methanol 70% were used. In addition, in some examples, a pH adjusting agent was used, either 0.1 M NaOH or 1.32 M NH₃, to favour lignin solvation, which was added to the methanol containing water to change its ionic strength prior to mixing with lignin to form a lignin slurry.

Table 4 shows the results obtained in which:

Slurry H₂P:MeOH=weight ratio of water to methanol present is the lignin slurry formed and subjected to extraction. The dry matter content of the lignin was taken into account.

Slurry DMC [%]=dry matter content, in % by weight, of the lignin slurry formed and subjected to extraction.

TABLE 4

| Test No. | Methanol used [%] | Methanol added to | Slurry H$_2$O:MeOH | Slurry DMC [%] | pH adjusting agent | Yield [%] | Lignin composition DMC [%] |
|---|---|---|---|---|---|---|---|
| 1 | 90 | Dry lignin | About 1:8.9 | 10.6 | — | 58 | 50 |
| 2 | 80 | Dry lignin | About 1:4 | 9.1 | — | 51 | 50 |
| 3 | 70 | Dry lignin | About 1:2.3 | 6.6 | — | 39 | 50 |
| 4 | 90 | Dry lignin | About 1:8.9 | 11.1 | 0.1M NaOH | 51 | 50 |
| 5 | 80 | Dry lignin | About 1:4 | 10.8 | 0.1M NaOH | 56 | 50 |
| 6 | 70 | Dry lignin | About 1:2.3 | 9.9 | 0.1M NaOH | 57 | 50 |
| 7 | 90 | Dry lignin | About 1:8.9 | 12.1 | 1.32M NH$_3$ | 57 | 50 |
| 8 | 80 | Dry lignin | About 1:4 | 14.0 | 1.32M NH$_3$ | 70 | 50 |
| 9 | 70 | Dry lignin | About 1:2.3 | 14.2 | 1.32M NH$_3$ | 73 | 50 |

As is evident from Table 4, all the process of the invention provided lignin compositions in a high yield and with a high content of dry matter. The weight ratio of water to methanol affected the yield. Higher yields were obtained when using 70% methanol in combination with ammonia.

Example 5

The general procedure according to Example 4 was essentially followed except that hardwood Kraft lignin was used as the dry lignin starting material. Table 5 shows the results obtained.

TABLE 5

| Test No. | Methanol used [%] | Methanol added to | Slurry H$_2$O:MeOH | Slurry DMC [%] | pH adjusting agent | Yield [%] | Lignin composition DMC [%] |
|---|---|---|---|---|---|---|---|
| 1 | 90 | Dry lignin | About 1:8.9 | 9.3 | — | 47 | 50 |
| 2 | 80 | Dry lignin | About 1:4 | 11.6 | — | 61 | 50 |
| 3 | 70 | Dry lignin | About 1:2.3 | 12.8 | — | 64 | 50 |
| 4 | 90 | Dry lignin | About 1:8.9 | 10.7 | 0.1M NaOH | 55 | 50 |
| 5 | 80 | Dry lignin | About 1:4 | 12.7 | 0.1M NaOH | 67 | 50 |
| 6 | 70 | Dry lignin | About 1:2.3 | 13.4 | 0.1M NaOH | 77 | 50 |
| 7 | 90 | Dry lignin | About 1:8.9 | 9.0 | 1.32M NH$_3$ | 44 | 50 |
| 8 | 80 | Dry lignin | About 1:4 | 10.4 | 1.32M NH$_3$ | 54 | 50 |
| 9 | 70 | Dry lignin | About 1:2.3 | 13.5 | 1.32M NH$_3$ | 75 | 50 |

As is evident from Table 5, all the process of the invention provided lignin compositions in high yields and high dry matter contents. The weight ratio of water to methanol influence the lignin yield, and the yield also depended on the pH adjusting agent added to the slurry subjected to extraction.

Example 6

A series of samples were prepared according to processes of the present disclosure, and processes known in the art, using Protobind PB1000 as the feedstock lignin material. The samples were prepared as indicated in Table 6 and the preparatory methods discussed below.

TABLE 6

| Sample Number | Preparation method | Solid-to-liquid ratio (w/w) | Solvent system* |
|---|---|---|---|
| 1 (reference) | n/a | n/a | n/a |
| 2 (reference) | 1 | 1:5 | 95% ethanol |

TABLE 6-continued

| Sample Number | Preparation method | Solid-to-liquid ratio (w/w) | Solvent system* |
|---|---|---|---|
| 3 (reference) | 1 | 1:5 | 99.9% methanol |
| 4 | 2 | 1:5 | 90% ethanol |
| 5 | 2 | 1:5 | 80% ethanol |
| 6 | 2 | 1:5 | 70% ethanol |
| 7 | 2 | 1:2 | 90% methanol |
| 8 | 2 | 1:2 | 80% methanol |
| 9 | 2 | 1:2 | 70% methanol |
| 10 | 3 | 1:1.15 | 90% ethanol |

*"%" indicates the weight ratio of alcohol to water in the solvent system.

Reference sample 1 is Protobind PB1000.

Preparation Method 1 (Reference Method)

Samples were prepared according to processes disclosed in PCT publication no. WO 2019/158752. PB 1000 was suspended in solvent at a solid-to-liquid ratio as defined in Table 6 in a one-litre, stirred Parr reactor. The mixture was stirred at 500 rpm at a temperature of 200° C., under a pressure of 18 bar, for a duration of 20 minutes. The resulting solutions were filtered using Büchner funnel with Whatman No. 4 filter paper (5 μm pore size).

Preparation Method 2

PB1000 was suspended in solvent at a solid-to-liquid ratio as defined in Table 6. The mixture was continuously stirred at 1000 rpm at a temperature of 25° C., under atmospheric pressure, for a duration of 1 hour. The mixture was then centrifuged at 765 G (rotor 1180, 3000 rpm) for 20 minutes at 25° C. to form a liquid fraction and a precipitate. The liquid fraction was transferred to balloons for rota-evaporation. The dry matter content and yield of the resulting supernatant were determined. The dry matter content of the samples prepared according to this method was approximately 40%.

Preparation Method 3

PB1000 was suspended in solvent at a solid-to-liquid ratio as defined in Table 6. The mixture was continuously stirred at 80 rpm at a temperature of 25° C., under atmospheric pressure, for a duration of approximately 18 hours. The mixture was then centrifuged at 765 G (rotor 1180, 3000 rpm) for 20 minutes at 25° C. to form a liquid fraction and a precipitate. The dry matter content and yield of the resulting supernatant were determined.

The number average molecular weight ($M_n$), weight average molecular weight ($M_w$), dispersity, and yield were determined. These data are presented in Table 7.

TABLE 7

| Sample | $M_n$ (Da) | $M_w$ (Da) | Đ | Yield (%) |
|---|---|---|---|---|
| 1 (reference) | 1050 | 3465 | 3.3 | n/a |
| 2 (reference) | 800 | 1840 | 2.3 | 57% |
| 3 (reference) | ND | ND | ND | ND |
| 4 | 900 | 2250 | 2.5 | 56% |
| 5 | 1100 | 4070 | 3.7 | 64% |
| 6 | 1100 | 3850 | 3.5 | 72% |
| 7 | 1100 | 5610 | 5.1 | 58% |
| 8 | 900 | 2430 | 2.7 | 51% |

TABLE 7-continued

| Sample | $M_n$ (Da) | $M_w$ (Da) | Đ | Yield (%) |
|---|---|---|---|---|
| 9 | 900 | 1980 | 2.2 | 39% |
| 10 | 1500 | 3450 | 2.3 | 85% |

ND = no data

These data indicate that the process described herein results in a smaller reduction of $M_n$, $M_w$ and/or Đ of the starting lignin material compared with processes known in the art, and in some cases the process described herein results in an apparent increase of $M_n$, $M_w$ and/or Đ. These data therefore indicate that a lesser degree of depolymerization, or substantially no depolymerization, is achieved in the process described herein compared with those known in the art, and that the product of the process described differs from those known in the art.

Example 7

Reference samples 2 and 3, and samples 4 and 7 were diluted or concentrated to provide samples having a dry matter concentration of 30%, 40%, 50%, and 60%.

Samples were concentrated with a Buchi rota-evaporator R300, with water bath at 50° C. until the required concentration was achieved; samples were diluted by addition of the solvent employed in the extraction process until the required concentration was achieved.

The viscosity of these samples across a range of shear rates was determined according to the protocol set out above. The results of this example are shown in FIGS. 1 to 4, and Table 8 below.

TABLE 8

| Reference Sample | Lowest observed viscosity (Pa·s) | Sample | Lowest observed viscosity (Pa·s) |
|---|---|---|---|
| 2(30%) | 0.00544 | 4(30%) | 0.00944 |
| 2(40%) | 0.02047 | 4(40%) | 0.2215 |
| 2(50%) | 0.0707 | 4(50%) | 1.51371 |
| 2(60%) | 0.70838 | 4(60%) | 7.72887 |
| 3(30%) | 0.00975 | 7(30%) | 0.01332 |
| 3(40%) | 0.02982 | 7(40%) | 0.07148 |
| 3(50%) | 0.12385 | 7(50%) | 0.16573 |
| 3(60%) | 0.70431 | 7(60%) | 2.97425 |

These data demonstrate that compositions provided by the process described herein have a higher viscosity compared with samples prepared according to previous processes having the same dry matter content. Further, these data support the differing degree of depolymerization observed in the present process compared with previous processes (evidenced in Example 6), given that the molecular weight distribution of the lignin in the sample is directly correlated to the viscosity of the sample; the underlying cause of the viscosity of the sample is the molecular weight distribution of the lignin in the sample. This effect is particularly prominent in samples having a high dry matter content (e.g. greater than 40%), where the viscosity of the samples prepared according to the present process are typically at least an order of magnitude greater than those prepared according to previous processes.

Example 8

The shear stress of the samples prepared in Example 7 across a range of shear rates was analysed according to the protocol set out above. The results of this example are shown in FIGS. 5 to 8 and Table 9.

TABLE 9

| Reference Sample | Slope (n) | k | $R^2$ | Sample | Slope (n) | k | $R^2$ |
|---|---|---|---|---|---|---|---|
| 2(30%) | 0.95 | 0.0107 | 0.995 | 4(30%) | 1.0 | 0.048 | 0.995 |
| 2(40%) | 0.97 | 0.029 | 0.997 | 4(40%) | 0.99 | 0.243 | 0.997 |
| 2(50%) | 0.94 | 0.098 | 0.999 | 4(50%) | 0.97 | 1.99 | 0.999 |
| 2(60%) | 0.94 | 1.167 | 0.999 | 4(60%) | 0.91 | 26.363 | 0.999 |
| 3(30%) | 0.98 | 0.0109 | 0.999 | 7(30%) | 1 | 0.013 | 0.99 |
| 3(40%) | 0.97 | 0.034 | 0.999 | 7(40%) | 0.99 | 0.046 | 1 |
| 3(50%) | 0.97 | 0.151 | 0.999 | 7(50%) | 0.99 | 0.176 | 0.99 |
| 3(60%) | 0.90 | 1.452 | 0.999 | 7(60%) | 0.94 | 8.05 | 0.99 |

These data demonstrate that, across most of the range of the shear rates assessed, the samples exhibited Newtonian fluid behaviour.

Example 9

The radius of gyration ($R_g$) of the lignin in samples was analysed using SAXS and WAXS according to the protocol set out above. The results of this analysis are provided in Table 10.

TABLE 10

| Sample | $R_g$ (Å) | Power-law exponent | Fitting error | Poly-dispersity in $R_g$ |
|---|---|---|---|---|
| 2(30%)* | 24.06 | 2.39 | 13.49 | 0.18 |
| 2(40%)* | 22.56 | 3.28 | 10.26 | 0.19 |
| 2(50%)* | 18.57 | 3.08 | 4.23 | 0.24 |
| 4(30%) | 49.33 | 4 | 65.75 | 0.23 |
| 4(40%) | 33.208 | 4 | 60.9 | 0.25 |
| 4(50%) | 20.92 | 4 | 25.96 | 0.23 |
| 3(30%)* | 21.389 | 3.283 | 18.393 | 0.137 |
| 3(40%)* | 17.497 | 3.443 | 14.744 | 0.22 |
| 3(50%)* | 13.997 | 3.4948 | 3.1203 | 0.31 |
| 3(60%)* | 9.5883 | 3.3043 | 7.484 | 0.3129 |
| 7(30%) | 104.27 | ND | 29.44 | 0.3 |
| 7(40%) | 36.73 | 2.57 | 19.98 | 0.22 |
| 7(50%) | 21.59 | 3.06 | 36.59 | 0.19 |
| 7(60%) | 12.67 | 3.68 | 77.47 | 0.33 |

*Reference sample

These data demonstrate that, for all samples, the radius of gyration ($R_g$) of the lignin in a sample decreases with increasing the dry matter content.

Further, these data demonstrate that the lignin in samples provided by the process described herein has a greater the radius of gyration ($R_g$) compared with samples prepared according to previous processes having the same dry matter content.

Example 10

Further samples were prepared using a variety of lignin starting materials, as set out in Table 11.

TABLE 11

| # | Lignin | Extraction Method | Company |
|---|---|---|---|
| A | Protobind 1000 | Alkaline | Phytaxis SA |
| B | Protobind 2000 | Alkaline (Modified) | Phytaxis SA |
| C | Protobind 6000 | Alkaline (Modified) | Phytaxis SA |
| D | Organosolv Lignin | Organosolv | Aldrich Chemical Company Inc. |
| E | Alkaline lignin | Kraft | Sigma Aldrich |
| F | UPM, Uruguay | Kraft | UPM |
| G | UPM, Biopiva 100 | Kraft | UPM |
| H | Lineo Classic | Kraft | Stora enzo |
| I | Lineo Classic Wet | Kraft | Stora enzo |

Figure 9:
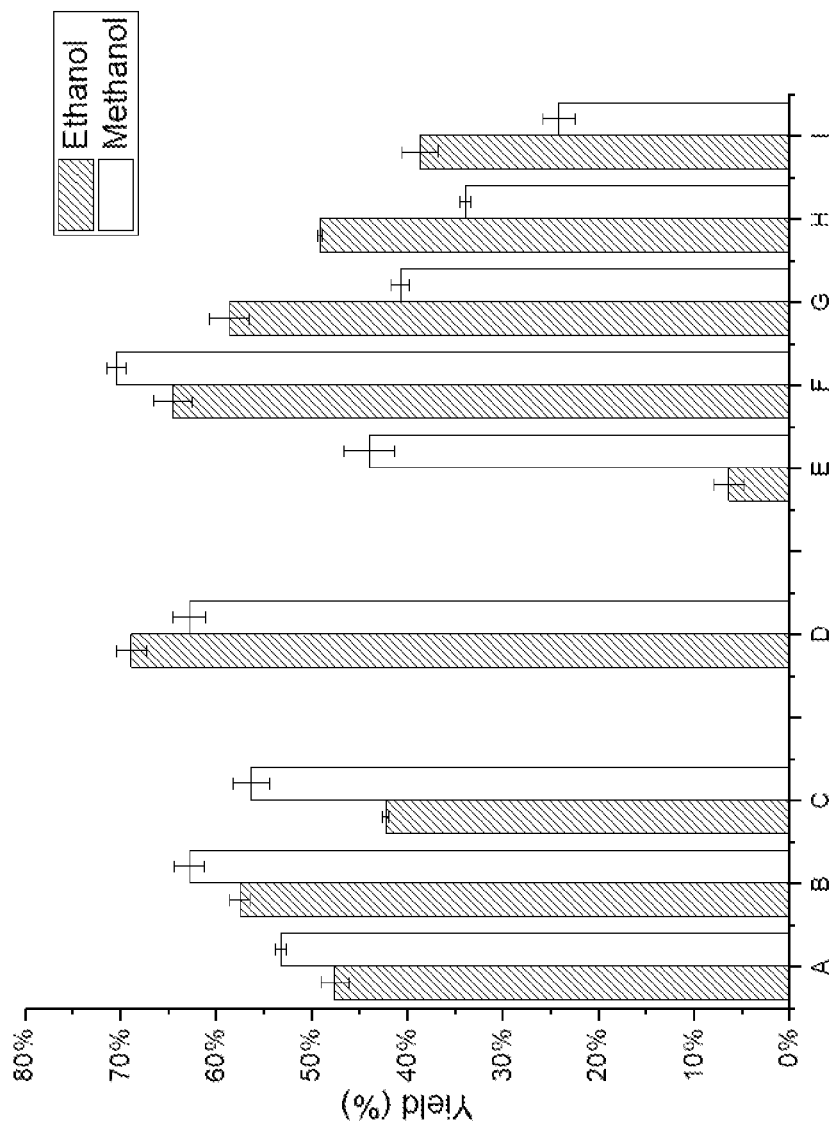
FIG. 9 is a chart depicting yields of lignin compositions according to examples across a variety of starting materials.

Tests were run in 2 ml round bottomed Eppendorf tubes. Between 140 and 300 mg of lignin was added to each tube. Solvent (ethanol or methanol) was added to each tube at a solid-to-liquid ratio of 1:5. Each mixture was continuously stirred at 700 rpm at a temperature of 20° C., under atmospheric pressure, for a duration of 60 minutes. Each mixture was then centrifuged at 1000 g for 10 min. The yields for these samples are shown in FIG. 9. These data indicate that the process described herein can be applied to lignins deriving from a variety of sources to provide compositions suitable for use as biofuels.

Example 11

A further series of samples were prepared according to the following process. Samples were prepared across a range of solvents (ethanol or methanol), water contents, and solid-to-liquid ratios.

Preparation Method 4

8 g of PB1000 was suspended in solvent in a 150 mL centrifuge tube in a solid-to-liquid ratio of 1:1.5. The solvent was either methanol (70%, 80%, or 90%), or ethanol (70%, 80%, or 90%), as indicated in Table 12 below. The mixture was continuously stirred at 500 rpm at a temperature of 25° C., under atmospheric pressure, for a duration of approximately 1 hour. The mixture was then centrifuged at 2000 rpm for 20 minutes at 25° C. to form a liquid fraction and a precipitate. The dry matter content and yield of the resulting supernatant were determined. The dry matter content for each of the samples prepared according to this method was approximately 40%. No heating was carried out at any stage of the preparation of these samples; substantially no liquid was removed in providing the sample.

The samples prepared according to Preparation Method 4 were compared with samples prepared according to Preparation Method 2, described hereinabove in relation to Example 6 and detailed in Table 6. This comparison is shown in Table 12; superscript numbers indicate the sample number of Table 6 to which the sample shown in Table 12 corresponds.

TABLE 12

| Solvent | Solid-to-liquid ratio (w/w) | Maximum Water content (%)* | Yield (%) | Solid-to-liquid ratio (w/w) | Maximum Water content (%) | Yield (%) |
|---|---|---|---|---|---|---|
| Methanol | 1:2 | 10[7] | 58%[7] | 1:1.5 | 10 | 71% |
| | | 17[8] | 51%[8] | | 17 | 72% |
| | | 23[9] | 39%[9] | | 23 | 52% |
| Ethanol | 1:5 | 10[4] | 56%[4] | 1:1.5 | 10 | 85% |
| | | 17[5] | 64%[5] | | 17 | 74% |
| | | 23[6] | 72%[6] | | 23 | 81% |

*measured via Karl Fischer titration.

These data indicate that high yield can be achieved with extraction at low temperature and pressure, and that a solid-to-liquid ratio of less than 1:2 can obviate the need for removing liquid from the extracted slurry to provide a composition suitable for use as a fuel.

The stability of some of the samples set out in Table 12 was analysed according to the protocol described hereinabove. The results of this analysis are presented in Table 13.

TABLE 13

| Solvent | Solid-to-liquid ratio (w/w) | Maximum Water content (%) | Stability | Solid-to-liquid ratio (w/w) | Maximum Water content (%) | Stability |
|---|---|---|---|---|---|---|
| Methanol | 1:2 | 10[7] | Super Stable | 1:1.5 | 10 | Stable |
|  |  | 17[8] | Super Stable |  | 17 | Stable |
| Ethanol | 1:5 | 10[7] | Super Stable | 1:1.5 | 10 | Stable |
|  |  | 17[8] | Super Stable |  | 17 | Stable |

These data indicate that lignin compositions obtained from these processes have a stability making them suitable for use as a fuel.

What is claimed is:

1. A process for producing a lignin composition, which process comprises:
   providing a lignin slurry comprising water and a water miscible organic solvent;
   subjecting the lignin slurry to extraction at an extraction temperature of 10° C. to 40° C. for an extraction time of at least 1 minute to provide an extracted slurry;
   removing liquid from the extracted slurry to provide an extracted lignin; and
   suspending the extracted lignin in a polar organic solvent to provide a lignin composition having a dry matter content of at least 30% by weight.

2. The process according to claim 1, wherein the lignin is obtained from one or more of a Kraft process, hardwood Kraft process, sulphite process, soda process, second generation bioethanol fermentation process, biorefinery process, cellulase enzyme treatment process, and hemicellulase enzyme treatment lignin.

3. The process according to claim 1, wherein the lignin slurry is obtained by:
   suspending a lignin in water to form an aqueous lignin slurry; and
   mixing the aqueous lignin slurry with a water miscible organic solvent;
   wherein the aqueous lignin slurry has a water content in the range of 20 to 50% by weight.

4. The process according to claim 1, wherein the lignin slurry has a weight ratio of water to water miscible organic solvent of 1:1 to 1:30.

5. The process according to claim 1, wherein the water miscible organic solvent and the polar organic solvent are independently selected from methanol, ethanol, or a mixture thereof.

6. The process according to claim 1, wherein the extraction is carried out at atmospheric pressure.

7. The process according to claim 1, wherein the extracted slurry formed contains a light fraction of lignin and a precipitate, the precipitate being separated from the light fraction, whereby the light fraction of lignin remains in the extracted slurry.

8. The process according to claim 1, wherein the liquid is removed from the extracted slurry by evaporation at a temperature in the range of 30 to 60° C.

9. The process according to claim 1, wherein the evaporated water miscible organic solvent is recycled in the process for providing a lignin slurry comprising water and a water miscible organic solvent.

10. The process according to claim 1, wherein a pH adjusting agent is present in the lignin slurry subjected to extraction.

11. The process according to claim 1, wherein the lignin composition is obtained in a yield of 40 to 90%.

* * * * *